United States Patent
Fayaud et al.

(10) Patent No.: US 7,633,289 B2
(45) Date of Patent: Dec. 15, 2009

(54) DISPLACEMENT ENCODER, DEVICE COMPRISING SUCH AN ENCODER AND METHOD OF MANUFACTURING SUCH AN ENCODER

(75) Inventors: Patrick Fayaud, Angers (FR); Laurent Guerbe, Grez-Neuville (FR)

(73) Assignee: Hutchinson, Paris (FR)

( * ) Notice: Subject to any disclaimer, the term of this patent is extended or adjusted under 35 U.S.C. 154(b) by 208 days.

(21) Appl. No.: 11/220,123

(22) Filed: Sep. 6, 2005

(65) Prior Publication Data

US 2006/0049821 A1 Mar. 9, 2006

(30) Foreign Application Priority Data

Sep. 6, 2004 (FR) .................................. 04 09400

(51) Int. Cl.
*G01P 3/54* (2006.01)
*G01B 7/30* (2006.01)
(52) U.S. Cl. .................................. 324/174; 324/207.25
(58) Field of Classification Search ......... 324/173–174, 324/207.11, 207.2, 207.21, 207.25, 207.23, 324/178, 179; 384/448; 73/514.39; 427/127
See application file for complete search history.

(56) References Cited

U.S. PATENT DOCUMENTS

| 4,635,501 | A | * | 1/1987 | Mizuno et al. ............. 74/433.5 |
| 5,713,577 | A | | 2/1998 | Lannert et al. |
| 6,692,153 | B2 | * | 2/2004 | Ohtsuki et al. ............. 384/448 |
| 6,906,509 | B2 | * | 6/2005 | Tomioka ..................... 324/174 |
| 2001/0051010 | A1 | | 12/2001 | Toda et al. |
| 2002/0131659 | A1 | | 9/2002 | Rutter et al. |
| 2002/0140418 | A1 | | 10/2002 | Ichiman |

FOREIGN PATENT DOCUMENTS

| DE | 100 50 983 A1 | 5/2002 |
| EP | 1 164 318 A | 12/2001 |
| EP | 0 949 510 B1 | 6/2003 |

\* cited by examiner

*Primary Examiner*—Reena Aurora
(74) *Attorney, Agent, or Firm*—Frost Brown Todd LLC

(57) ABSTRACT

Displacement encoder for a moving shaft, having a sleeve intended to be clamped on the shaft and an encoding zone having polarized magnetic mark. The encoding zone has permanent magnet disposed against the sleeve and a layer of elastomer is overmolded and adherized on the magnet and on the sleeve.

11 Claims, 3 Drawing Sheets

DISPLACEMENT ENCODER, DEVICE COMPRISING SUCH AN ENCODER AND METHOD OF MANUFACTURING SUCH AN ENCODER

FIELD OF THE INVENTION

The present invention relates to a displacement encoder for a moving shaft and, more particularly, to an encoder comprising a sleeve intended to be clamped on the shaft and an encoding zone having at least one polarized magnetic mark.

In many applications, in particular for wheel shafts, output shafts of gearboxes or crankshafts of internal combustion engines, the shafts are equipped with angular or linear displacement encoding devices in order to know their instantaneous speed and/or their position and/or their direction of displacement.

BACKGROUND OF THE INVENTION

The encoding function can be carried out by one or more polarized magnetic marks which form an encoding zone whose displacement is detected by a magnetic field detector disposed facing this encoding zone. For this type of encoder, it is known, in particular from the document FR-A 2 777 060, to produce the mark or marks of the encoding zone using a ferrite filled elastomer layer, that is to say a polymer of the elastomer type containing a high proportion of magnetic particles such as, for example, ferrite powder, which is adherized during its moulding onto the sleeve of the encoder. Such a solution is practical to use because of the formation of the magnetic layer and of the polarized marks, and the adherization of this layer to the sleeve during the moulding process.

However, the magnetic field created by the ferrite filled elastomer does not reach a sufficient intensity for certain applications, in particular when the air-gap between the encoding zone reaches a value that is too large because of the space available for the magnetic field sensor or because of the variations in the air-gap during the functioning of the device. In order to improve the intensity of the magnetic field created by a ferrite filled elastomer, it is known to increase the proportion of magnetic particles. However, the densities of magnetic particles henceforth achieved make the ferrite filled elastomer too fragile and crumbly for certain applications.

OBJECTS AND SUMMARY OF THE INVENTION

The purpose of the present invention is to overcome these disadvantages by proposing a displacement encoder adapted to generate an intense magnetic field whilst being usable in applications where severe mechanical stresses exist, such as vibrations, and possibly in which the environment can be chemically aggressive.

For this purpose, the present invention relates to a displacement encoder of the said type, characterized in that the encoding zone comprises at least one permanent magnet disposed against the sleeve and adapted to form at least one polarized mark and in that a layer of elastomer is overmolded and adherized on the magnet and at least on a part of the sleeve.

The elastomer layer thus produced makes it possible to ensure a robust mechanical bond, in particular in the presence of vibrations and thermal expansions, between the magnet and the sleeve, whether the latter is made of plastic or metal, due to the chemical bond created between these parts by adherization. Moreover, the overmoulding creates a layer which isolates the permanent magnet from the external environment.

The permanent magnet or magnets of the encoding zone form magnetic marks having high intensity, which are more easily detected by a magnetic field sensor. Tests show that the magnetic intensity of the marks can reach values two times higher than with ferrite filled elastomer for encoders that are otherwise comparable.

The fact that the permanent magnet or magnets are protected by an elastomer layer allows the use of standard magnets which do not have particularly high resistance to chemical oxidation specifications, such as for example ferrite-based magnets, which makes it possible to limit the cost of the encoder.

In preferred embodiments of the invention, one or other of the following arrangements are also used:

the permanent magnet has a rear face disposed at least partially against the sleeve, a front face opposite to the rear face and side faces connecting said rear and front faces, the elastomer layer covering the side faces having a thickness at least five times greater than the thickness of the elastomer layer covering the front face, which makes it possible to produce a good compromise between the protection of the magnet, the dimensions of the encoder and its mechanical strength;

the sleeve has a bearing portion against which the magnet bears, said magnet covering the major part of the width of the bearing portion;

the permanent magnet is made of sintered magnetic particles, and preferably of the samarium-cobalt type;

the permanent magnet is a plastomagnet and preferably a plastomagnet of samarium-cobalt type which has the advantage of retaining a strong magnetic field when the temperature rises;

an annular lip formed in one piece with the material of the elastomer layer is designed to come into contact with a fixed casing surrounding the shaft;

the sleeve has an annular collar extending radially, against which is disposed the permanent magnet which has the shape of a flat ring;

the sleeve has a cylindrical surface extending parallel with its longitudinal axis, surrounded by the permanent magnet which has a tubular shape;

the encoding zone is formed from a plurality of permanent magnets.

Moreover, the invention also relates to a device comprising a moving shaft and a displacement encoder which comprises a sleeve clamped onto the shaft and an encoding zone having at least one polarized magnetic mark and adapted to encode a displacement of the said shaft, characterized in that the encoding zone is formed from at least one permanent magnet disposed against the sleeve, and in that an elastomer layer is overmolded and adherized onto the magnet and at least onto a part of the sleeve.

This device can furthermore comprise a casing filled with liquid, or with grease, in which the rotary shaft penetrates, and an annular lip, made in one piece from the material of the elastomer layer, which is in sliding contact with the casing and ensures the fluid-tightness between said shaft and said casing.

It will be noted that it can be a device comprising a rotary shaft or a shaft sliding in the longitudinal direction of the latter, the displacement encoder having an encoding zone whose shape is adapted to encode an angular displacement or a linear displacement respectively.

Furthermore, the invention relates to a method of manufacturing a displacement encoder comprising a sleeve made of magnetic material, at least one permanent magnet adapted to form an encoding zone and an elastomer layer, said method comprising the steps of:

surface treatment of the sleeve using an appropriate treatment comprising the deposit of an adherization layer;

surface treatment of the permanent magnet using an appropriate treatment comprising the deposit of an adherization layer; and then positioning of said sleeve and of said at least one permanent magnet in a mould;

overmolding of the elastomer layer onto the magnet and at least a part of the sleeve; and vulcanization of the elastomer layer.

This method can also comprise an operation of forming polarized marks by the application of a magnetic field to the permanent magnet, after the step of overmolding.

BRIEF DESCRIPTION OF THE DRAWINGS

Other features and advantages of the invention will become apparent during the following description, given by way of non-limiting example, with reference to the appended drawings in which.

MORE DETAILED DESCRIPTION

The same references have been used in the different figures to denote identical or similar elements.

Figure 1:
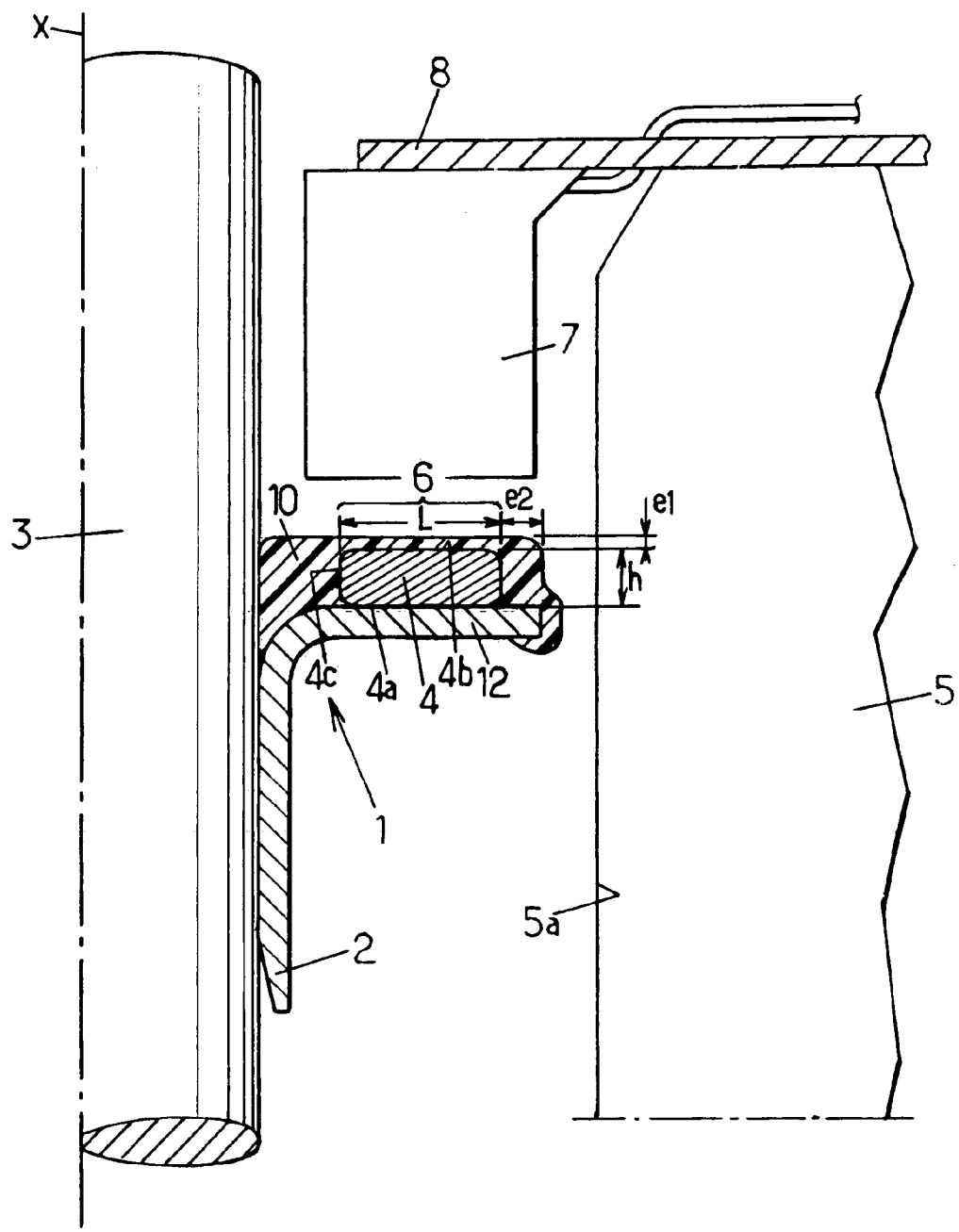
FIG. 1 is a simplified longitudinal cross-sectional view of a shaft provided with an encoder according to a first embodiment of the invention.

As can be seen in FIG. 1, the angular encoder 1 comprises a sleeve 2 clamped in rotation onto a rotary shaft 3 through the opening of a fixed casing 5. Polarized magnetic marks are provided in a zone 6, called the encoding zone, of the encoder.

The fixed casing 5 surrounding the angular encoder 1 serves as a fixed base for a sensor 7 firmly attached to the casing by the intermediary of a plate 8.

The rotary shaft 3 can be constituted by any rotary machine shaft, such as for example a transmission shaft or a wheel shaft. It will be noted, on the one hand, that the angular encoder 1 is not necessarily placed on a portion of the shaft surrounded by a fixed casing, but can be placed at a distance from any casing or bearing seeing that a sensor can be held close to the encoding zone 6. Furthermore, it could be a shaft carrying out a movement of translation along its longitudinal axis X.

The sleeve 2 is made of metal and is mounted on the rotary shaft 3 by force fitting. This particularly simple fitting makes it possible to immobilize the sleeve 2 in rotation and in translation with respect to the shaft 3. It is possible however to use any other fitting which ensures immobilisation of the sleeve in rotation with respect to the shaft. The use of a sleeve made of plastic or of thermoplastic elastomer can also be envisaged.

The encoding zone 6 has a shape, in this case flat annular, and a number of polarized marks adapted such that its displacement with the shaft 3 makes it possible to determine, for example, the angular position, the speed of rotation or the direction of rotation of the shaft.

The polarized marks of the encoding zone 6 are formed by a succession of angular sectors alternately polarized north-south, possibly with a non-polarized sector or a polarized zone which is greater or smaller than the others, in order to determine an absolute angular position of the shaft. The encoding zone 6 therefore forms a circular track in this embodiment. However, if the angular encoder is used solely for detecting a rotation or a direction of rotation of the shaft, the presence of polarized marks over the whole of the periphery of the sleeve 2 is not necessary.

The sensor 7 must be adapted to detect a variation in the magnetic field and it is possible to use, in particular, a Hall effect sensor or equivalent in order to do this. The sensor 7 is positioned in a static manner facing the circular encoding zone 6 formed by the polarized marks, in order to detect the variations in the magnetic field.

The encoding zone comprises a permanent magnet 4 which generates a bipolar or multi-polar magnetic field in order to form one or more polarized marks detected by the sensor 7. It can be any known type of magnet which is in the form of a rigid part produced before the manufacture of the displacement encoder 1. Permanent magnets generate more intense fields than those that can be obtained with a material of the ferrite filled elastomer type, such that the air-gap, that is to say the distance separating the encoding zone from the sensor 7, can be greater, or it is possible to use a less sensitive magnetic sensor.

The type of permanent magnet 4 is chosen in particular according to its cost and the intensity sought for the polarized marks. By way of example, the permanent magnet is of the sintered type, that is to say formed of magnetic particles agglomerated together by sintering, also called ceramic magnets. This type of magnet, such as for example the magnets comprising strontium ferrite or samarium-cobalt, generates magnetic fields stronger than those generated by ferrite filled elastomers, of the order of twice as strong in the case of samarium-cobalt. Sintered magnets based on samarium-cobalt have a low loss of magnetic field when the temperature rises, and are therefore advantageous for producing encoders having to function over a wide range of temperature, for example from −50° C. to +250° C.

It is also possible to use a plastomagnet which is in the form of a relatively rigid part in which the magnetic particles, such as for example rare earths, strontium ferrites or samarium-cobalt, are bonded by a plastic or a thermoplastic elastomer. Certain plastomagnets, and in particular those of the samarium-cobalt type, have the advantage of generating intense magnetic fields that are stable over time. Furthermore, they can be produced in varied shapes.

The magnet 4 has a rear face 4a disposed against the sleeve 2, a front face 4b opposite to the rear face 4a and side faces 4c connecting the front and rear faces. It will be noted that the rear face 4a is not necessarily entirely in contact with the sleeve 2. In fact, the sleeve can comprise reliefs for positioning the magnet, such that spaces can remain between the sleeve 2 and the magnet 4.

A polymer layer 10 is overmoulded over the magnet, and more precisely over all of its apparent faces (4b, 4c) when it is disposed against the sleeve 2. The polymer layer 10 is also overmoulded over a part of the sleeve which is adjacent to the magnet.

The polymer used for producing the layer 10 is an elastomer. This type of polymer, comprising natural or synthetic rubbers, makes it possible to ensure the mechanical fixing of the permanent magnet 4 on the sleeve 2 thanks to its adherization to metal and plastic materials capabilities. Moreover, they have good resistance to mechanical stresses, in particular to vibrations and to thermal expansions, as well as a satisfactory resistance to most of the chemical products that can be encountered in the environment of a displacement encoder. It will be noted however that the external surface of the elastomer layer 10 can be covered by an additional thin protective layer made from another polymer, such as PTFE which has a particular resistance to certain chemical products.

The elastomer layer covering the front face 4b of the magnet has a thickness e1 measured perpendicular to the front face, whereas the side faces 4c are covered by an elastomer layer having a thickness e2. The thickness e2 of the elastomer layer covering the side faces 4c, which extend as far as the sleeve 2, is at least five times greater than the thickness e1 over the front face 4b, in order to obtain a good compromise between the mechanical holding of the magnet 4 on the sleeve 2 obtained by adherization, the dimension of the displacement encoder along the longitudinal axis X of the shaft and the protection of the magnet with respect to the environment of the encoder. Depending on the applications for which the displacement encoder is intended, this ratio between the thicknesses e1 and e2 can be much higher, but in most cases a ratio substantially equal to five is satisfactory. It will be noted that, for the thickness e2, the value to take into consideration is that of the minimal average thickness of the layer present along a side face, given that on certain side faces 4c the thickness e2 can be much greater in order that the elastomer layer 10 fulfils a function other than the holding of the magnet 4. The thickness e1 can be limited to a few hundredths of a millimetre, whilst retaining its protective function. It will be noted that the possible spaces, which remain between the rear face 4a of the magnet and the sleeve 2, can be more or less partially filled up during the overmoulding of the elastomer layer 10.

For the permanent magnet 4, a magnet in the form of a thin part is chosen, that is to say one whose thickness measured between the rear face 4a and the front face 4b, h in FIG. 1, is substantially less than the width L of the encoding zone 6. A thickness h of the magnet 4 within the range from one sixth to one third of the width L of the encoding zone makes it possible to obtain a good compromise between the intensity of the magnetic field generated and the dimension of the displacement encoder along the X axis.

The encoding zone 6 has an annular shape surrounding the whole of the periphery of the shaft, in particular for the purpose of encoding an absolute angular position of the shaft or of determining the speed or the direction of rotation of the shaft in a virtually instantaneous manner. In order to form an annular encoding zone, one or more permanent magnets are disposed against the sleeve 2, in order to describe a circle concentric with the shaft.

For example, in the embodiment shown in FIG. 1, the sleeve 2 has an annular collar 12 extending radially with respect to the longitudinal axis X. The circular encoding zone 6 is therefore formed by an annular magnet 4 magnetised in a multi-polar manner, possibly with singularities, and disposed against the collar 12. The permanent magnet 4 has the shape of a flat ring disposed concentrically with the longitudinal axis X, which makes it possible to form the whole of the encoding zone accurately. However, it is perfectly possible to envisage producing the encoding zone by means of several permanent magnets having the shape of an angular portion of a flat ring, the circumferential end faces of two consecutive magnets being disposed one against the other in order to form a continuous encoding zone. It is also possible to envisage placing one or more magnets that are, for example, in the form of inserts in order to form a unique mark or several spaced marks.

It will be noted that the magnet 4 has a width L which makes it possible to cover the major part, here approximately 75%, of the portion of the sleeve 2 formed by the collar 12.

Figure 2:
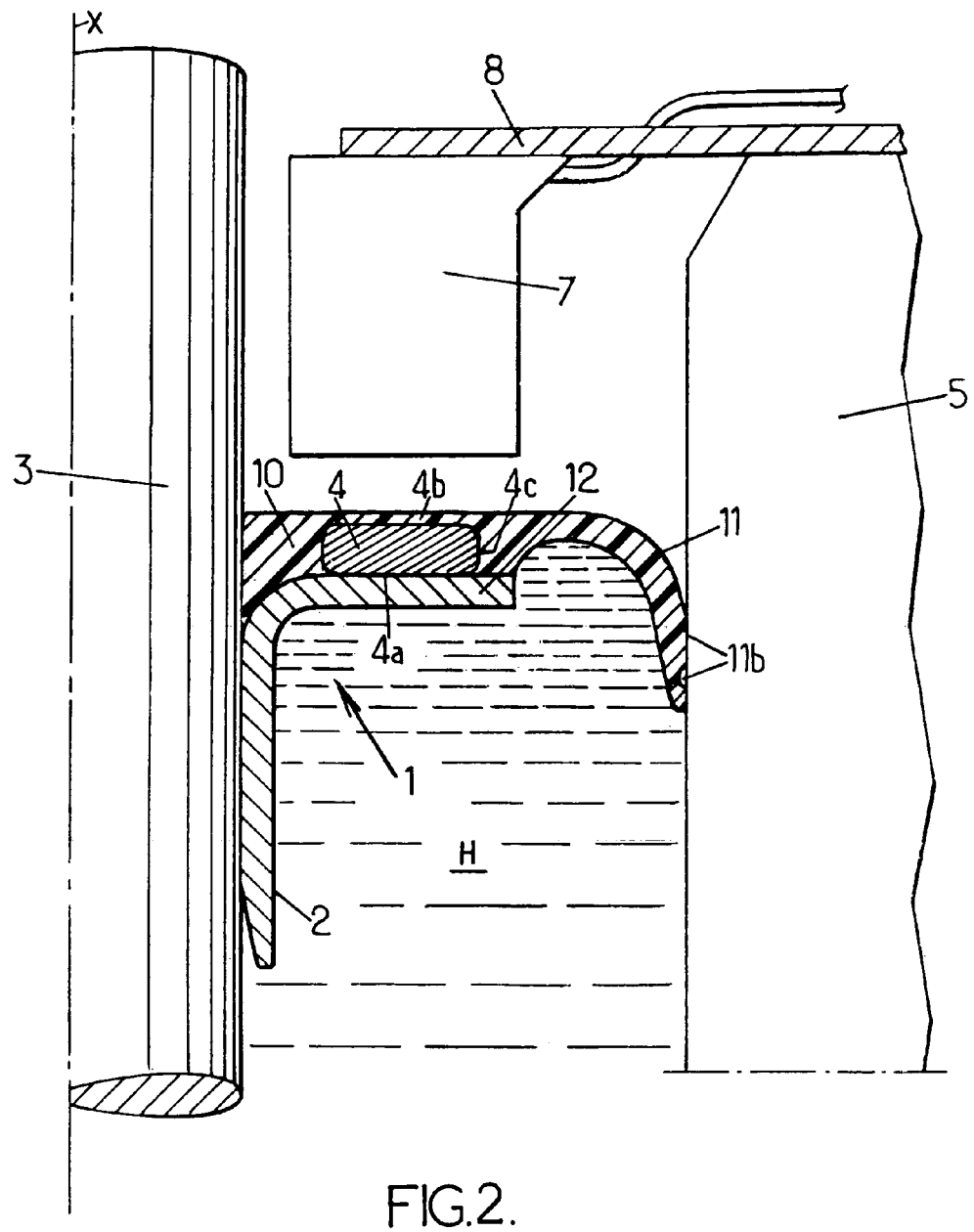
FIG. 2 is a cross-sectional view, similar to FIG. 1, of a second embodiment.

In the embodiment shown in FIG. 2, the elastomer layer 10 extends radially with respect to the shaft 3 beyond the collar 12 until it comes into contact with the surface 5a of the fixed casing. Thus, the layer 10 forms a sealing lip 11 in sliding rotary contact with the casing 5. The elastomer layer 10 and the lip 11 formed in one piece with the latter, are produced simultaneously during the manufacturing process.

The angular encoder 1 thus produced fulfils a dynamic fluid-tightness sealing function in addition to its encoding function. The second embodiment of the angular encoder is therefore more particularly intended for a device such as an engine or a gear box in which the casing 5 filled with a liquid H, possibly under pressure, is traversed by a shaft 3, in order to provide fluid-tightness between the shaft and the casing.

In the embodiment shown in FIG. 2, the base of the lip 11 extends substantially in the extension of the layer 10 and is curved, in the configuration shown, during the positioning of the angular encoder on the shaft 3. The end 11a of the lip can comprise on its surface in contact with the fixed casing 5 grooves 11b which improve the dynamic fluid-tightness between the lip and the radial surface 5a of the casing facing the shaft 3.

It is of course possible for the lip 11 to have a more complex geometric configuration in order to be adapted to the configuration of the surface with which it must come into contact or in order to increase its fluid-tightness properties.

Figure 3:
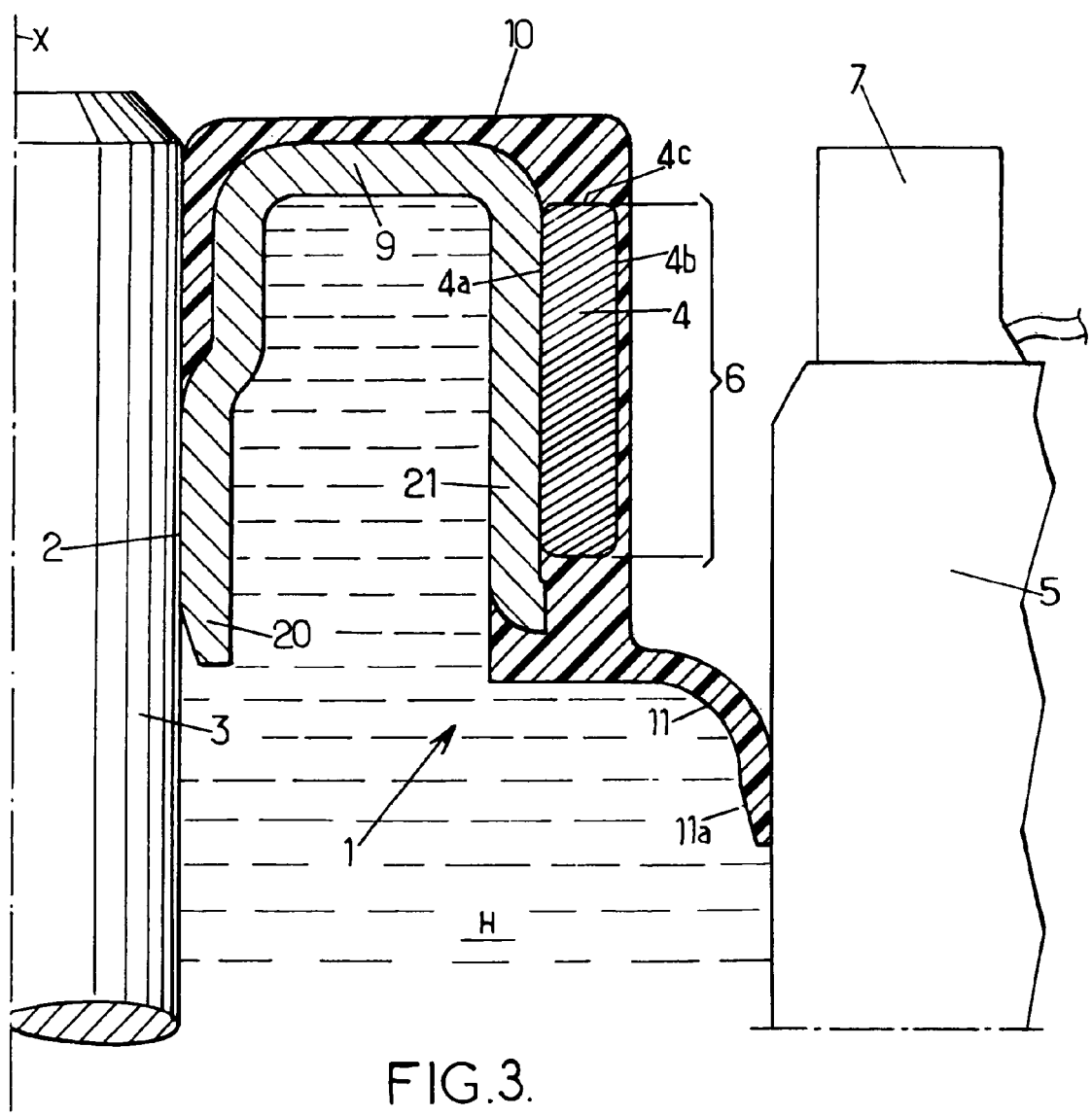
FIG. 3 is a cross-sectional view, similar to FIG. 1, of a third embodiment.

FIG. 3 shows a third embodiment similar to the second embodiment, that is to say comprising a fluid-tightness lip 11 integrally formed with the protective layer 10.

In this third embodiment, the encoding zone 6 extends longitudinally and is oriented radially towards the sensor 7. The encoding zone 6 is formed by a cylindrical tubular magnet 4 which closely surrounds a cylindrical wall of the sleeve 2 coaxial with the longitudinal axis X, such that the encoding zone is annular and concentric with the shaft 3. The use of a one-piece annular magnet makes it possible to obtain a high accuracy of positioning of the polarized marks, but the use of several magnets is also possible.

The protective layer 10 covers the magnet 4, but also the entire external surface of the sleeve 2 and thus protects the whole of the encoder against mechanical or chemical attacks coming from outside of the casing 5.

The sleeve 2 has a U-shaped cross-section, a first branch 20 of the U clamping the shaft 3, a second branch 21 supporting the magnet 4 and the base 9 of the U making it possible to take up a part of the clearance between the shaft 3 and the casing 5.

The sleeve 2 of the encoder is produced using a method comprising the following stages.

A surface treatment of the sleeve 2 is carried out in order to allow the adherization of the elastomer layer 10 during the vulcanization of the latter. This treatment can vary depending on the nature of the sleeve 10, and in particular depending on whether it is a metal or a plastic sleeve. For example, the surface treatment can firstly comprise a decreasing operation followed by a phosphating operation.

The stage of treating the sleeve 2 comprises the deposit of an adherization layer which is in the form of a very thin film of a chemical precursor to adherization. For example, the adherization layer can be constituted by a phenolic resin.

The method also comprises a stage of surface treatment of the permanent magnet 4, which can vary substantially depending on whether it is a magnet of sintered magnetic particles or a plastomagnet. But the treatment of the permanent magnet also comprises the deposit of an adherization layer. It will be noted that the surface treatment of the sleeve 2 and of the permanent magnet 4 can be substantially different because of the nature of their material and of their initial surface condition.

When the sleeve 2 and the permanent magnet 4 are suitably treated and covered with an adherization layer, they are placed in a mould. The position of the permanent magnet 4 with respect to the sleeve 2 is adjusted, for example using low reliefs formed on the sleeve 2.

The elastomer layer 10 is then overmoulded on the permanent magnet 4 and at least a part of the sleeve 2, either by elastomer injection, or by hot deformation of a preform by applying pressure with a part of the mould.

The mould is then kept at a suitable temperature over a specified time in order to obtain the vulcanization of the elastomer and thus its adherization to the sleeve 2 and to the permanent magnet 4.

The adherization of the elastomer layer 10, obtained by the formation of a chemical bond and different from simple gluing, produces an encoder 1 that is in the form of a single unit part which cannot be disassembled and which resists vibrations and thermal expansions particularly well.

The use of a single magnet makes it possible to accurately form all of the polarized marks of the encoding zone 6, particularly due to a formation of polarized marks by the application of a permanent magnetization to the magnet 4 after its adherization to the sleeve 2.

The embodiments described above are of course in no way limiting. It is in particular possible to produce an angular encoder whose encoding zone 6 does not extent in a radial or longitudinal direction but in a direction that is inclined with the respect to the shaft.

Moreover, it will be apparent to those skilled in the art that the invention can be applied to a linear encoder, integral with a sliding shaft, whose encoding zone comprises one or more magnets. In this type of application, the encoding zone has one or more polarized marks distributed along the direction of sliding of the shaft, in order to be adapted to encode a linear displacement.

We claim:

1. Displacement encoder for a moving shaft, comprising a sleeve intended to be clamped on the shaft and an encoding zone having at least one polarized magnetic mark, wherein the encoding zone comprises at least one permanent magnet disposed against the sleeve and wherein a layer of elastomer is overmolded and adherized on the magnet and at least on a part of the sleeve, said adherization causing formation of strong chemically-based bonds resulting in a robust mechanical bond between said magnet and said sleeve.

2. Displacement encoder according to claim 1, wherein the permanent magnet has a rear face disposed at least partially against the sleeve, a front face opposite to the rear face and side faces connecting said rear and front faces, the elastomer layer covering the side faces having a thickness at least five times greater than the thickness of the elastomer layer covering the front face.

3. Displacement encoder according to claim 1, wherein the sleeve has a bearing portion against which the magnet bears, said magnet covering the major part of the width of the bearing portion.

4. Displacement encoder according to claim 1, wherein the permanent magnet is made of sintered magnetic particles.

5. Displacement encoder according to claim 1, wherein the permanent magnet is a plastomagnet.

6. Displacement encoder according to claim 1. wherein an annular lip formed in one piece with the material of the elastomer layer is designed to come into contact with a fixed casing surrounding the shaft.

7. Displacement encoder according to claim 1, wherein the sleeve has an annular collar extending radially, against which is disposed the permanent magnet which has the shape of a flat ring.

8. Displacement encoder according to claim 1, wherein the sleeve has a cylindrical surface extending parallel with its longitudinal axis, surrounded by the permanent magnet which has a tubular shape.

9. Displacement encoder according to claim 1, wherein the encoding zone is formed from a plurality of permanent magnets.

10. Device comprising a moving shaft and a displacement encoder which comprises a sleeve clamped onto the shaft and an encoding zone having at least one polarized magnetic mark adapted to encode a displacement of the said shaft, characterized in that the encoding zone comprises at least one permanent magnet disposed against the sleeve, and wherein an elastomer layer is overmolded and adherized onto the magnet and at least onto a part of the sleeve, said adherization causing formation of strong chemically-based bonds resulting in a robust mechanical bond between said magnet and said sleeve.

11. Device according to claim 10, further comprising a casing filled with liquid in which the rotary shaft penetrates, and in which an annular lip, made in one piece from the material of the elastomer layer, is in sliding contact with the casing and ensures the fluid-tightness between said shaft and said casing.

* * * * *